UNITED STATES PATENT OFFICE.

NAPOLEON PETINOT, OF NEW YORK, N. Y., ASSIGNOR TO UNITED STATES FERRO-ALLOYS CORPORATION, OF NEW YORK, N. Y., A CORPORATION OF NEW YORK.

ALLOY OF IRON ZIRCONIUM AND SILICON AND PROCESS FOR THE PRODUCTION THEREOF 1,389,695.     Specification of Letters Patent.     Patented Sept. 6, 1921.

No Drawing.     Application filed August 18, 1919. Serial No. 318,322.

*To all whom it may concern:*

Be it known that I, NAPOLEON PETINOT, a citizen of the United States, residing in the city of New York, county of New York, and State of New York, have invented a certain new and useful Alloy of Iron Zirconium and Silicon and Process for the Production Thereof, of which the following is a full, clear, and exact description.

My invention relates generally to an alloy which, when used in connection with molten steel or iron, will greatly improve their physical properties.

The principal object of my invention has been to provide an alloy, which, on account of the proportions of its constituents and their chemical combinations, has certain valuable properties when used in the treatment of molten iron and steel and will act, when added to molten steel or iron, as a scavenger for removing nitrogen and oxygen therefrom.

I have found that in the regular practice of treating iron and steel with ferro-zirconium that a certain amount of zirconium combines with the oxygen existing in the steel or iron either as free oxygen or combined as oxids, and forms zirconium oxid. This zirconium-oxid has a very high melting point and does not become fluid enough to rise with a slag to the surface of the molten bath, when this bath has been treated with ferro-zirconium. The oxid becomes more or less pasty and stays entrapped in the iron or steel as such oxid or it is combined with particles of slag in the metal.

By introducing silicon in the alloy in certain definite proportions and then using this alloy for the treatment of iron or steel, I have discovered that results are secured which are superior to those heretofore attained in the art. This is probably because silicon and zirconium will oxidize giving as a resultant silica and zirconium-oxid which is a more fusible combination.

I am aware that some alloys of zirconium and iron with a large silicon content have been manufactured. The silicon content in such alloys is present mostly as an impurity and is reduced from the silica contained in the zirconium-oxid ore used. In my process I use an alloy which has just enough zirconium and silicon in it to make the imprisoned slag or oxids fusible, and it is very important that the ratio between the silicon and zirconium be exact or they will have such a high melting point that the desired results will not be secured.

I have found that iron or steel which is treated with ferro-zirconium and which contains at least 0.1% of silicon results in a much better product so far as physical qualities are concerned than iron or steel which does not contain the silicon. This latter statement applies more particularly to grades known as soft steel such as those used for wire and sheets. In present practice the silicon in the iron or steel just referred to is derived from ferro-silicon, which is added to the ladle when the steel or iron is tapped from the furnace. Part of the silicon thus added is oxidized to silica, thus forming a slag which is left in the ladle after the steel or iron is poured off.

In my experiments preceding this invention and which led to this invention, I took some basic slag from a heat of steel, reduced it to a fine powder and mixed it with 50% of pure silicon-oxid. I found the melting point of this mixture to be above 1900° centigrade. I then took the same mix and added thereto from 10% to 50% of silica and by determining the fusing point found a mix of lower melting point. This latter mixture was one in which the weight of silica was 15% of the weight of the oxid of zirconium.

I then made an alloy of iron zirconium and silicon in such proportion that when combined with any slag from the metal it is far more fusible than those mixtures which are obtained when the ferro-metal is treated with only ferro-zirconium.

My invention is designed to affect the melting point of that portion of the slag or oxids which are scattered throughout and imprisoned within the molten mass.

In carrying out my invention, if the alloy is used to treat steel which contains iron oxid, the following reactions will take place simultaneously:

$$Zr + 2FeO = 2Fe + ZrO_2$$
$$Si + 2FeO = 2Fe + SiO_2$$

If the zirconium and silicon are in proper proportions, the zirconium-oxid and silica formed will combine with the slag or oxids which are imprisoned in the mass of molten steel, thus forming silico-zirconates, which have low melting points. These silico-zirconates, on account of their low melting points, form relatively mobile liquids which readily escape from the molten steel, thus producing a superior steel. My treatment of steel with the alloy described is far superior to the treatment of steel with ferro-zirconium or ferro-silicon separately, because, with my alloy, the zirconium-oxid and silica are formed simultaneously, and in proximity to one another and the slag or oxids which it is desired to remove from the molten metal.

It is very important that the proportions between the silicon and zirconium be exact. If the percentage of zirconium is greater than a certain definite amount, the combination will have a high melting point. In order to best carry out my process, the alloy should contain from 15% to 40% zirconium, from 3% to 8% silicon, carbon in various amounts and the balance iron. In this alloy the silicon exists as iron silicide and the iron and zirconium as a double carbid being partly combined with the carbon and part of the carbon being in the graphitic state. The graphitic carbon contained in the alloy is probably produced by the presence of the silicon, which, as is well known to metallurgists, tends to throw carbon out of the combination and into the graphitic state.

In making my alloy, I use a mixture of baddeleyite (zirconium-oxid) containing from 70% to 96% zirconium oxid. I also use silica, iron scrap and charcoal which together contain 50% or more of carbon. The proportions of such a mixture may be as follows:—

Baddeleyite, 50 pounds.
Quartz, 7 pounds.
Charcoal, 25 pounds.
Scrap iron, 57 pounds.

The above proportions are given only as an example and I do not, therefore, wish to be limited precisely either to the ingredients or the proportions named.

In making my alloy, the mixture is placed into a furnace, preferably of the Siemen's type; one, for example, consisting of a crucible made of a carbon or graphite and having a carbon electrode. By using this type of furnace I find that it is not necessary to add more carbon to the charge than that which is theoretically required to reduce the oxids, from any additional carbon required in the mixture will be supplied by the carbon electrode. I have found by experience that in making one ton of alloy, 300 pounds of carbon from the electrodes have been used. This method of adding the required carbon seems to be more satisfactory than putting into the original mixture an excess of carbon. Carbon particles supplied from the electrode are at such a high temperature that they react more readily with the oxids to be reduced, than if they were incorporated with the original mixture.

At the end of the operation, whatever slag is present in the charge is reduced by the carbon derived from the electrode and finally becomes such a thin layer that the arc is formed directly on the surface of the metal bath. At this time the working of the furnace becomes very unsteady and molten metal is projected from the crucible, all of which indicates that the reaction is completed and it is time to tap the finished alloy from the furnace.

Having thus described my invention, what I claim is:

1. An alloy of iron, zirconium and silicon in which the ratio of zirconium to silicon is not less than 80 parts of zirconium to 20 parts of silicon and not more than 85 parts of zirconium to 15 parts of silicon.

2. An alloy of iron, zirconium and silicon embodying from 69% to 80% of iron combined with zirconium and silicon, the silicon being in the proportion of about one-quarter of the weight of the zirconium.

3. The method of making an alloy of iron zirconium and silicon consisting in heating, in an electric furnace, a mixture containing zirconium oxid, silicon oxid, and iron, the iron being in a greater quantity than the total quantity zirconium and silicon present, and that in such mixture, the ratio of zirconium and silicon be not less than 80 parts of zirconium to 20 parts of silicon and not more than 85 parts of zirconium to 15 parts of silicon, together with a sufficient quantity of carbon to perform the reduction, whereby an iron bath and a slag of silico-zirconates is formed, and the silicon and zirconium are absorbed by the iron and the silico-zirconates are completely reduced.

In testimony whereof, I have hereunto signed my name.

NAPOLEON PETINOT.